F. B. DUNLAP.
TIRE REPAIRING DEVICE.
APPLICATION FILED FEB. 8, 1918.
1,307,190.
Patented June 17, 1919.
2 SHEETS—SHEET 1.
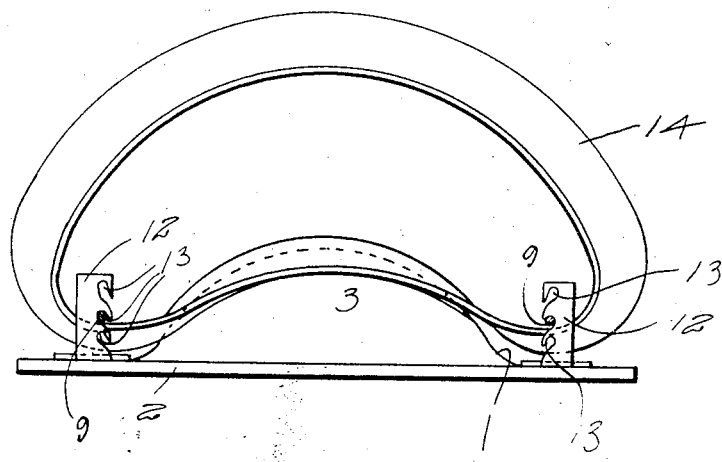
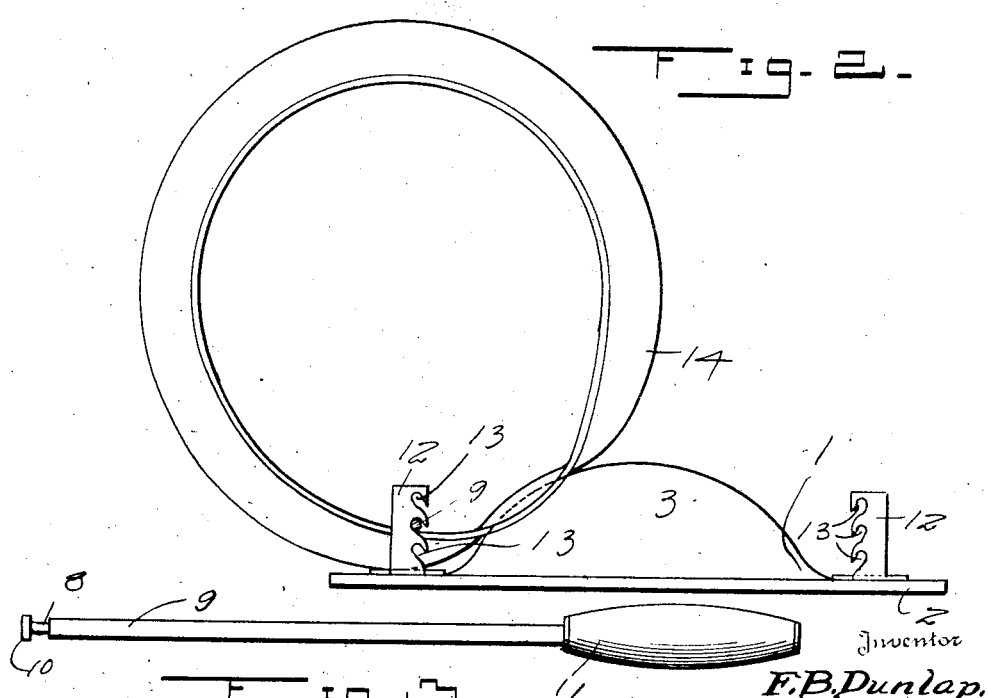

F. B. DUNLAP.
TIRE REPAIRING DEVICE.
APPLICATION FILED FEB. 8, 1918.
1,307,190.
Patented June 17, 1919.
2 SHEETS—SHEET 2.
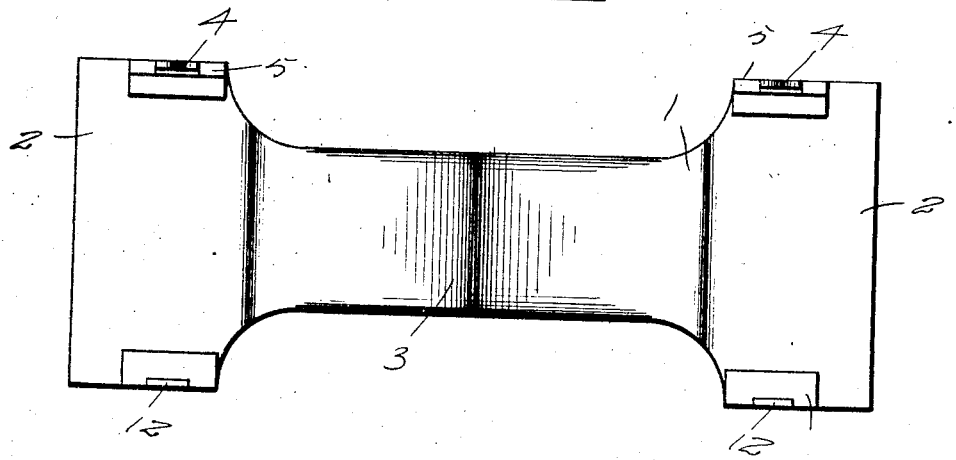
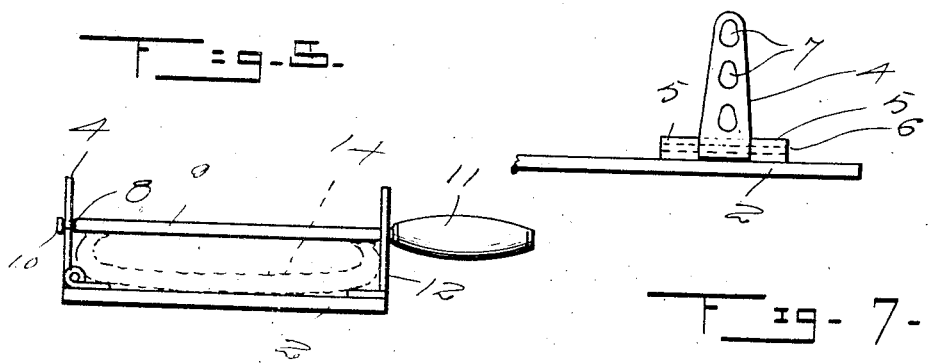
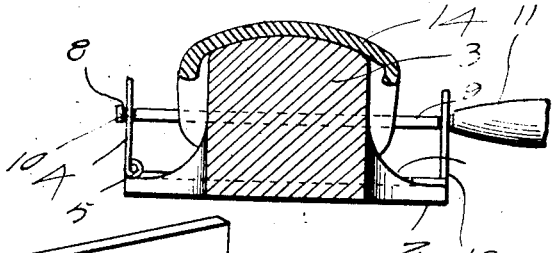
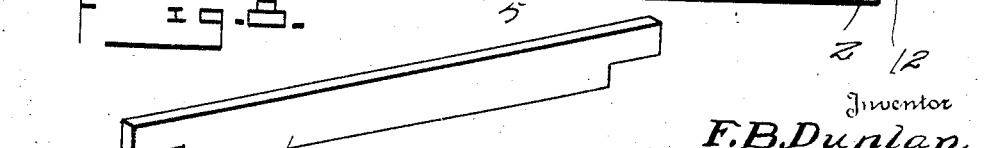
Inventor
F. B. Dunlap.

UNITED STATES PATENT OFFICE.

FORREST B. DUNLAP, OF TULSA, OKLAHOMA, ASSIGNOR OF ONE-HALF TO EARLE C. STRICKER, OF TULSA, OKLAHOMA.

TIRE-REPAIRING DEVICE.

1,307,190.

Specification of Letters Patent. Patented June 17, 1919.

Application filed February 8, 1918. Serial No. 216,053.

*To all whom it may concern:*

Be it known that I, FORREST B. DUNLAP, a citizen of the United States, residing at Tulsa, in the county of Tulsa and State of Oklahoma, have invented certain new and useful Improvements in Tire-Repairing Devices; and I do hereby declare the following to be a full, clear, and exact description of the invention, such as will enable others skilled in the art to which it appertains to make and use the same.

This invention relates to improvements in a tire repairing device and more particularly a device especially adapted for holding a shoe or casing in such a position that a patch or the like may be readily applied to the inner surface thereof.

Another object of this invention is the provision of a base having formed thereon a block adapted to support the casing or shoe in such a manner that the inner surface thereof will be exposed outermost, so that a hole or the like in the shoe or casing may be readily repaired.

A further object of this invention is the provision of clamps upon the base adapted to hold the shoe or casing under a tension upon the block.

A still further object of this invention is the provision of a tire repairing device of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a side elevation of a tire repairing device constructed in accordance with my invention, Fig. 2 is a similar view illustrating the initial position of the tire when securing the same upon the block, Fig. 3 is a side elevation of one of the clamping bars, Fig. 4 is a plan view of the device with the tire clamping bars removed, Fig. 5 is an end elevation illustrating the clamping members securing the tire upon the base, Fig. 6 is a detail view illustrating the means for adjustably and hingedly connecting one end of one of the clamping bars to the base, Fig. 7 is a transverse sectional view illustrating the curvature of the block, Fig. 8 is a perspective view of a spreading member for a shoe or casing.

Referring in detail to the drawings, the numeral 1 indicates a base of elongated formation having enlarged ends 2. The base 1 has formed intermediate its ends a casing or shoe supporting block 3, which is of arcuate formation in cross section to conform to the contour of a shoe or casing. Straps 4 are hinged to pintle bearings 5 by pintles 6 and the pintle bearings 5 are secured upon one edge of the enlarged ends 2 of the base 1. The straps 4 are provided with a plurality of relatively spaced openings 7 to receive the reduced ends 8 of clamping bars 9. The clamping bars 9 have heads 10 formed upon their reduced ends for retaining the reduced portions within the openings 7 of the straps 4. Handles 11 are secured to the other end of the clamping bars 9.

Locking plates 12 are secured on the ends 2 of the base 1 on the opposite edges from the straps 4 and are provided upon their inner edges with a plurality of upwardly directed notches 13 for the purpose of receiving the clamping bars 9 adjacent the handles 11.

When desiring to apply the casing or shoe 14 to my invention, the spreading member 15 is positioned within the casing or shoe so as to spread the edges or bead portions thereof. The spreading member 15 has cut away portions 16 at each end thereof to form shoulders 17 adapted to engage the inner edges of the beads of the casing or shoe. The casing or shoe 14 is first positioned as shown in Fig. 2 upon the base 1 and one of the clamping bars 9 is applied to one of the clamping plates as clearly shown in Fig. 2 and the tire is then bent downwardly over the supporting block 3 into a position as shown in Fig. 1 turning a portion thereof inside out. To hold the casing or shoe in this position, the other clamping bar is placed in engagement with the notches 13 upon the other clamping plate 12, it will therefore be seen that the inner surface of the shoe or casing is disposed and transversely curved so that new fabric or patches may be readily applied to the inner surface of the shoe or casing so as to repair holes or the like that may be upon the inner surface thereof.

While I have shown and described the preferred embodiment of my invention, it will be understood that minor changes in construction, combination and arrangement of parts may be made without departing from the spirit and scope of the invention as claimed.

Having thus described my invention, what I claim is:

A tire repairing device comprising a base, a supporting block upon said base for engagement with a tire, straps hinged to said base, clamping bars adjustably connected to the straps and adapted to overlie the tire, and clamping plates secured to the base and adapted to receive the clamping bars.

In testimony whereof I affix my signature in presence of two witnesses.

FORREST B. DUNLAP.

Witnesses:
  HESS MCKNIGHT,
  H. HELLER.